May 1, 1962  H. LAMBERT ETAL  3,032,003
PORTABLE DAIRYMAN'S INDICATOR
Filed March 1, 1960
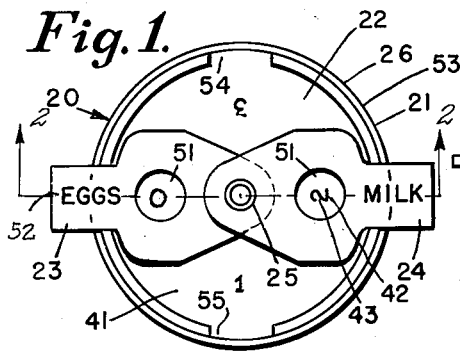
Fig. 1.
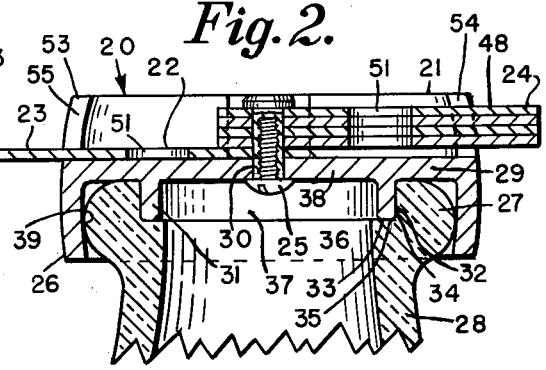
Fig. 2.
Fig. 3.
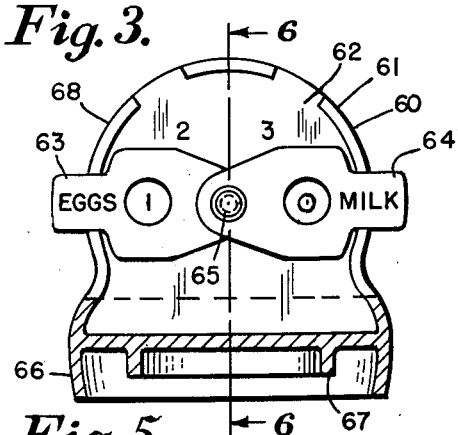
Fig. 4.
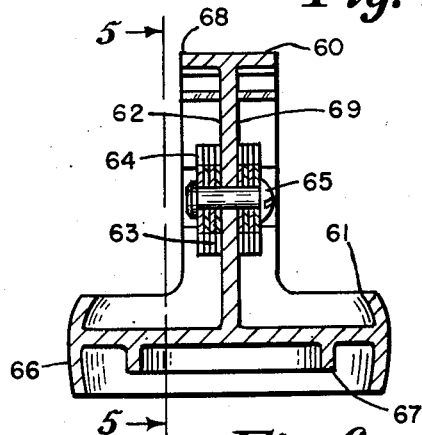
Fig. 5.
Fig. 6.
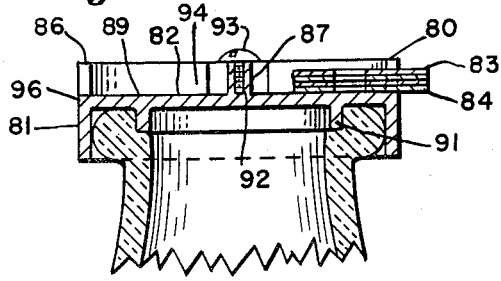
Fig. 7.
INVENTOR.
HERBERT LAMBERT
WALTER L. GIFFIN
BY
Pearson + Pearson
ATTORNEYS

3,032,003
PORTABLE DAIRYMAN'S INDICATOR

Herbert Lambert, Haverhill, Mass., and Walter L. Giffin, Sanbornville, N.H., assignors to The Elgee Products Company, Inc., Sanbornville, N.H., a corporation of New Hampshire
Filed Mar. 1, 1960, Ser. No. 12,084
6 Claims. (Cl. 116—133)

This invention relates to an order indicator of the portable type intended to be shifted from container to container rather than to be permanently attached to the wall of a house.

The portable indicator of this invention is especially adapted for use by dairymen to avoid that type of order in which a piece of paper containing a hurriedly written note is curled inside the mouth of an empty milk bottle by a busy housewife. Such paper notes are subject to misinterpretation by the milkman, subject to blowing out of the milk bottle and sometimes fall within the damp interior of the bottle for difficult retrieval. In addition, notes of this type cannot be read by the delivery man from his vehicle and he, therefore, must return to the vehicle to fill the order.

It is the principal object of this invention to provide a dairyman's indicator which is firmly seated both around and within the mouth of a milk bottle and in which the movable indicators are firmly locked to the periphery of the dial whereby dislodgment and misindication is virtually impossible.

Another object of the invention is to provide a portable order indicator in which a dial, fixed to a cap, bears the numerical quantity indicia and large tabs, movable on the dial, bear the dairy product inscription, the number of tabs being changeable to accord with the number of products sold by the dairyman. Thus the dial is not crowded, the graphic material remains large and easily read and both the dairyman and the housewife use only the tabs actually needed to convey the message, the others being hidden or masked.

A further object of the invention is to provide a dairyman's indicator requiring only a few structural parts, namely a unitary cap and dial, a number of identical wide tabs of resilient, flexible, sheet material rotatable on the dial and pivot means which does not break the hermetic air seal of the cap.

Still another object of the invention is to provide a dairyman's indicator in which the indication means may be in a vertical plane and readable from a considerable distance, in which the pointers, or tabs, are securely locked against rotative movement and in which the indicator cannot topple over or tilt despite its high centre of gravity.

A still further object of the invention is to provide a dairyman's indicator in which the indicating tabs are rotatable around a dial and of elastomeric material, the tabs being locked in recesses around the periphery of the dial and requiring distortion to be rotated relative to the dial.

Other objects and advantages of the invention will be apparent from the claims, the description of the drawing and from the drawing in which FIG. 1 is a plan view of one form of the portable indicator of the invention.

FIG. 2 is an enlarged side view in section on line 2—2 of FIG. 1.

FIG. 3 is a side view of the device shown in FIG. 1.

FIG. 4 is an enlarged perspective view of one of the segmental shaped, elastomeric tabs of the invention.

FIG. 5 is a side view of a modified form of the invention in section on line 5—5 of FIG. 6.

FIG. 6 is a view, in section line 6—6 of FIG. 5.

FIG. 7 is a view similar to FIG. 2 but showing the preferred form of the invention in which the unitary cap is also a seal.

In the drawing, the dairyman's indicator 20 of the invention, as shown in FIGURES 1 to 4, includes the unitary cap 21, a dial 22, a plurality of identical, segmental tabs such as 23, 24 and pivot means such as pivot pin 25.

The unitary cap 21 is preferably formed of a thermoset type plastic, in one piece, with an outer cylindrical flange 26 which fits around the outside of the rim 27 of a container, such as the glass bottle 28, when the horizontal portion 29 is supported on the top of the rim 27. A central pivot pin hole 30 is provided in the horizontal portion 29 for the pivot pin 25, the latter conveniently being of the threaded telescopable type although a double headed rivet, bolt or other pivot means may be used if desired.

The unitary cap 21 is provided with an inner cylindrical flange 31, which depends from, and is integral with, the horizontal portion 29. The vertical outside face 32 and the horizontal lower face 33 of flange 31 closely fit and lie against the corresponding vertical face 34 and horizontal face 35 of the bottle cap seat 36 of the bottle 28. The flange 31 forms an annular, inverted, U-shaped recess 37 with the lower face 38 of the horizontal portion 29 and the inner face 39 of the outer flange 26 in which the rim 27 of bottle 28 is slidably received as shown in FIG. 2. By reason of the inner flange 31, in addition to the flange 26, the cap 21 can be firmly seated on the bottle 28 with no danger of accidental dislodgment.

The dial 22 preferably comprises the upper face 41 of the horizontal portion 29 of cap 21 and it is circular and horizontal. There are no foodstuff inscriptions on the dial 22 and no quantity indicia other than a series 42 of numerical indicia such as at 43. The series 42 extends in an arc or a circle around the dial 22 and may consist of the spaced apart numerals 1, 2, 3 and 0, or the words "Thank You" may be substituted for the zero.

As shown in FIG. 4, each movable tab such as 23 or 24 is of substantial area relative to the area of the dial 22 and is of generally segmental shape with a narrow inner end 44, a relatively wide outer end 45 and an integral extension 46 serving as a finger grip and locking detent. Each tab 23 or 24 is preferably formed of thin plastic sheet material such as cellulose acetate butyrate, about ten thousandths of an inch in thickness and is elastomeric. Each tab includes a pivot pin hole 47 at the inner end 44 whereby a stack 48 of superposed tabs may be rotatably mounted on the pivot pin 25. The stack 48 may include up to twenty-five tabs and still be only about one quarter inch in height and the tabs may be substituted in the stack, removed or added thereto because of the separable telescopable pivot pin 25.

Each tab 23 includes a viewing aperture 51, of greater area than the area occupied by any one of the numerical indicia 43, namely the numbers 1, 2, 3 or 0. The apertures 51, the pivot holes 47 and the numerical indicia 43 are so spaced that one of the numerical indicia will be visible through the aperture 51 of a tab when the tab is directly over the same as shown in FIG. 1. Each tab 23 also includes a different inscription 52 such as the words Eggs, Milk, Cream, Eggnog, Orange Juice and the like. The inscription is preferably on the detent 46 in order that it be quickly revealed when a tab is slightly rotated relative to the stack.

In addition, each tab is preferably of a different color, for example yellow for Eggs, red for Butter, etc., whereby the dairy product can be determined by color as well as by the inscription. In illustration, a tab 24 is cross hatched to indicate the color yellow at 49, and inscribed with the word Eggs.

To prevent the accidental movement of the tabs 23 or 24 after the indicator has been set, a peripheral tab retention flange 53 is provided integral with cap 21. The flange 53 extends peripherally around the dial 22 and generally normal thereto although it may be curved inwardly as shown for appearance and easier gripping. The retention flange 53 is substantially equal in height to the usual maximum height of a stack of twenty-five tabs for example about one quarter inch. Spaced around the flange 53 are the recesses 54 and 55, which are about one quarter inch in depth so that they will accommodate the detents 46 of the entire stack or a single detent 46. Each recess 54 is aligned with a numeral such as 1, 2, 3 or 0 on the dial face 41 whereby the numeral will be revealed through the aperture 51 when the detent 46 is in the recess corresponding to the numeral. To rotate a tab, it is necessary to flex the stack 48 away from the dial, turn the tab while its outer end 45 and detent 46 are flexed away from the dial to the desired recess and then allow the detent to flex into the recess. It cannot thereafter be moved unless it is intentionally flexed and the order set by the housewife remains locked in position until the indicator is reset.

In FIGS. 5 and 6 a modification is shown in which the indicator 60 includes a cap 61, a dial 62, a plurality of identical segmental tabs 63 and 64 and a pivot pin 65 all similar to corresponding parts of cap 21. The cap 60 also includes the outer flange 66, the inner flange 67 and the peripheral tab retention flange 68 all similar to the corresponding flanges 26, 31 and 53. In this modification the dial 62, however, is in a vertical plane, rather than in a horizontal plane and it is parti-circular rather than fully circular for reasons of appearance and to lower the centre of gravity. As shown in FIG. 6, the vertical dial 62 can be back to back with an identical dial 69 whereby twice the number of possible orders can be achieved if desirable. In addition, at least one side of the vertical dial 62 can be easily read from a distance, by color alone, so that the delivery man can bring the dairy product requested with him to the door. Most housewives have a regular order from day to day and only occasionally require extra cream, butter or the like. The delivery man can see the red color of the butter tab on the indicator 62 and save a trip back to his vehicle.

In FIG. 7 a preferred form of the invention is illustrated as the indicator 80. Indicator 80 is identical with indicator 20 in comprising a unitary cap 81, dial 82, identical segmental tabs 83 and 84, an outer cylindrical flange 86, a horizontal portion 89 and an inner cylindrical flange 91. The tab retention flange 86 is similar to flange 53 except that it is vertical for convenience of manufacture. The indicator 80 differs from indicators 20 and corresponds with indicator 60 in the fact that the horizontal portion 89 is not pierced with a pivot hole. The indicators 60 and 80 are therefore useful in sealing a full milk bottle in the refrigerator, after the disc type bottle cap has been removed. The indicator 80, being of reduced height, is especially useful for this purpose since it will fit within the height of the usual refrigerator shelves. Instead of a pivot pin 25, the cap 80 includes an integral, central post 87, having a threaded hole 92 for a threaded machine screw 93. The post 87 is equal in height to the recesses 94 and flange 86, but it can be easily cut to a lesser height after manufacture if desired.

It should be noted that the outer face 96 of the cap 81 lends itself to bearing an advertisement of the dairyman and that negative inscriptions are not used on the tabs or on the dial. Thus the numeral 1 viewed through the aperture of the Eggs tab will be taken to mean one dozen and thus help to avoid the ordering of odd quantities, the splitting of cartons, etc.

We claim:
1. A portable dairyman's indicator comprising a unitary cap; integral means on said cap for detachably affixing said cap on the top portion of a milk bottle; a dial integral with said unitary cap, said dial having a series of different numerical quantity indicia spaced peripherally therearound to represent the number of dairy products desired, a stack of superposed, identical segmental tabs of thin, elastomeric sheet material rotatably mounted on said cap to turn peripherally around said dial, each said tab having an aperture therethrough for revealing one of said quantity indicia when overlying the same and each said tab having a different foodstuff inscription thereon to represent the type of dairy product desired and an integral tab retention flange extending peripherally of, and normal to, said dial, said flange having a series of recesses spaced therearound, each equal in depth to the height of said stack and each adapted to receive and lock the entire stack against rotation, said tabs being rotatable around said dial by flexing the peripheral portions thereof away from said dial and out of said recesses.

2. A portable dairyman's indicator comprising a unitary cap; means for detachably affixing said cap on a milk bottle; a dial on said unitary cap; a stack of superposed, identical, flat tabs of flexible resilient sheet material, each having an inner end rotatably mounted at the centre of said dial, each having an outer end extending radially of said dial and each terminating in a locking detent; and a tab retention flange, extending peripherally of, and normal to, said dial, said flange having spaced recesses therearound, each equal in depth to the height of said stack and each adapted to receive and lock all of the superposed detents of said stack against rotation, the outer ends of said tabs being flexible away from said dial for moving the same from one said recess to another.

3. An indicator as specified in claim 2 wherein the inner and outer ends of each said tab are segmental in shape and each said tab includes a viewing aperture in the outer end thereof for exposing a portion of said dial.

4. An indicator as specified in claim 2 wherein each said locking detent extends well outside said tab retention flange to constitute a finger grip.

5. An indicator as specified in claim 2 wherein said dial is vertically disposed on said cap and said detachable affixing means comprises an outer cylindrical flange depending from said cap and fitting around the rim of said bottle and an inner cylindrical flange depending from said cap and fitting the cap seat of said bottle.

6. An indicator as specified in claim 2 plus detachable pivot pin means rotatably mounting said tabs on said dial, quantity indicia on said dial and food stuff indicia on the detents of said tabs whereby tabs can be added to or subtracted from said stack to conform with changes in foodstuffs to be indicated.

References Cited in the file of this patent

UNITED STATES PATENTS

| | | |
|---|---|---|
| 974,806 | McQuin | Nov. 8, 1910 |
| 1,436,583 | Feist | Nov. 21, 1922 |
| 1,864,416 | Conover | June 21, 1932 |
| 2,024,889 | Simeone | Dec. 17, 1935 |
| 2,587,147 | Guion | Feb. 26, 1952 |
| 2,771,854 | Cronenwett | Nov. 27, 1956 |
| 2,829,620 | Wilson | Apr. 8, 1958 |
| 2,847,971 | Painter | Aug. 19, 1958 |

FOREIGN PATENTS

| | | |
|---|---|---|
| 109,313 | Australia | Dec. 21, 1939 |
| 626,718 | Great Britain | July 20, 1949 |